(12) United States Patent
Kawai

(10) Patent No.: US 6,597,340 B1
(45) Date of Patent: Jul. 22, 2003

(54) ELECTROPHORESIS DISPLAY AND ITS PRODUCTION METHOD

(75) Inventor: Hideyuki Kawai, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/674,679

(22) PCT Filed: Mar. 6, 2000

(86) PCT No.: PCT/JP00/01351
§ 371 (c)(1),
(2), (4) Date: Nov. 3, 2000

(87) PCT Pub. No.: WO00/54101
PCT Pub. Date: Sep. 14, 2000

(30) Foreign Application Priority Data

Mar. 5, 1999 (JP) ............................................. 11-059351

(51) Int. Cl.[7] ................................................. G09G 3/34
(52) U.S. Cl. .......................... 345/107; 345/108; 349/89
(58) Field of Search .......................... 345/107, 85, 106, 345/204; 349/156

(56) References Cited

U.S. PATENT DOCUMENTS

| | | | |
|---|---|---|---|
| 3,683,382 A | | 8/1972 | Ballinger |
| 4,522,472 A | * | 6/1985 | Liebert et al. ............... 359/296 |
| 4,648,956 A | * | 3/1987 | Marshall et al. ............. 359/296 |
| 6,067,185 A | | 5/2000 | Albert et al. |
| 6,252,564 B1 | * | 6/2001 | Albert et al. ................... 345/1 |
| 6,383,619 B1 | * | 5/2002 | Engler et al. ............... 428/212 |

FOREIGN PATENT DOCUMENTS

| | | |
|---|---|---|
| JP | 6-486116 | 3/1989 |
| JP | A-64-86116 | 3/1989 |
| JP | 10-149118 A | 6/1998 |

* cited by examiner

Primary Examiner—Steven Saras
Assistant Examiner—Fritz Alphonse
(74) Attorney, Agent, or Firm—Oliff & Berridge, PLC

(57) ABSTRACT

To provide an electrophoretic display which is capable of improving the contrast. A back substrate 52 provided with a transparent electrode 54 and a transparent substrate 53 provided with transparent electrodes $55_1$, to $55_3$ are arranged at a predetermined distance D. Between the transparent substrate 53 and the back substrate 52 are arranged a large number of microcapsules. In each of the microcapsules 56A is sealed a dispersion comprised of electrophoretic particles 57 dispersed in a dispersion medium 61 in advance by the microcapsulation technique. The plurality of microcapsules 56A are sandwiched between the transparent substrate 53 and the back substrate 52. The display surface side and the back side thereof are flat in shape.

5 Claims, 7 Drawing Sheets

ELECTROPHORESIS DISPLAY AND ITS PRODUCTION METHOD

TECHNICAL FIELD

The present invention relates to an electrophoretic display which utilizes the movement of electrophoretic particles in a medium due to application of an electric field, and a method of producing the same.

BACKGROUND ART

Japanese Unexamined Patent Publication (Kokai) No. 64-86116 and Japanese Unexamined Patent Publication (Kokai) No. 10-149118 disclose inventions of electrophoretic displays using microcapsules.

FIG. 7 is an elementary sectional view for illustrating an example of a conventional electrophoretic display using microcapsules.

In the electrophoretic display 1, a transparent substrate 3 provided with transparent electrodes $5_1$ to $5_3$ and a transparent back substrate 2 having a transparent electrode 4 are arranged at a predetermined distance d so that the transparent electrode 4 and the transparent electrodes $5_1$ to $5_3$ face each other.

The transparent substrate 3 and the back substrate 2 are formed by using an insulating synthetic resin such as PET (polyethylene terephthalate).

The transparent electrode 4 and the transparent electrodes $5_1$ to $5_3$ are formed by, for example, transparent electrode films (ITO (indium oxide) films).

A large number of microcapsules 6 are arranged between the transparent substrate 3 and the back substrate 2.

The microcapsules 6 are sealed with (comprise) a dispersion comprised of electrophoretic particles 7 dispersed in a dispersion medium 11 (dispersion system) in advance by the microcapsulation technique. In natural state, these shapes are spherical.

The electrophoretic particles 7 are comprised of charge particles, for example, white pigment.

The dispersion medium 11 is comprised of a colored dispersion medium, for example, colored black.

Hereinafter, the liquid mixture between the electrophoretic particles 7 and dispersion medium 11 sealed in the microcapsules 6 will also be referred to as the electrophoretic display dispersion.

Between the transparent substrate 3 and the back substrate 2, the large number of microcapsules 6 and a binder 8 for fixing the large number of microcapsules 6 are inserted.

The binder 8 is transparent and has good bondability with the transparent electrodes 4 and $5_1$ to $5_3$.

In this configuration, for example, when making the transparent electrode 4 the ground potential and applying a negative voltage to the transparent electrodes $5_1$ and $5_3$, electrophoretic particles 7, that is, the charged particles, inside the microcapsules 6 between the transparent electrode 4 and the transparent electrodes $5_1$ and $5_3$ move toward the transparent electrode 4. As a result, the microcapsules 6 between the transparent electrode 4 and the transparent electrodes $5_1$ and $5_3$ exhibit a black color with respect to the direction of the transparent substrate 3.

Further, if making the transparent electrode 4 the ground potential and applying a positive voltage to the transparent electrode $5_2$, electrophoretic particles 7, that is, the charged particles inside the microcapsules 6 between the transparent electrode 4 and the transparent electrode $5_2$ move toward the transparent electrode $5_2$. As a result, the microcapsules 6 between the transparent electrode 4 and the transparent electrode $5_2$ exhibit a white color with respect to the direction of the transparent substrate 3.

An electrophoretic display having spherical microcapsules seal with an electrophoretic display dispersion, suffers from the following disadvantages (1) and (2).

(1) The portions between the spherical microcapsules, that is, the binder portions, do not contain electrophoretic particles, so the contrast may be liable to be lowered.

(2) The electric field intensity acting on the electrophoretic display dispersion in the spherical microcapsules positioned between the electrodes becomes nonuniform, so localization of the electrophoretic particles may be liable to be caused.

Japanese Unexamined Patent Publication (Kokai) No. 10-149118 discloses making the dielectric constant the same between the electrophoretic display dispersion and binder to make the electric field intensity uniform, but if this is done, limits arise in the selection of the materials used for the electrophoretic display dispersion and binder.

DISCLOSURE OF THE INVENTION

An object of the present invention is to provide the electrophoretic display which is capable of improving the contrast, and a method of producing the same.

The electrophoretic display according to the present invention comprises a first substrate comprising a transparent substrate on one surface of which a transparent electrode comprising a first electrode is formed and the other surface of which forms a display surface; a second substrate on one surface of which a second electrode is formed and arranged in parallel with the first substrate so that the second electrode faces the first electrode; and a plurality of microcapsules containing a dispersion comprising a liquid phase dispersion medium and electrophoretic particles, arranged between the first and second electrodes so as to contact each electrode, and formed in a flat shape along the first electrode at least at the first electrode side.

According to the present invention, preferably the plurality of microcapsules are also formed flat along the second electrode at the second electrode side.

The method of production of an electrophoretic display having a plurality of microcapsules containing a dispersion comprising a liquid phase dispersion medium and electrophoretic particles, a first substrate comprised of a transparent substrate provided with a first electrode comprised of a transparent electrode, and a second substrate provided with a second electrode, according to the present invention comprises comprising the steps of housing the plurality of microcapsules and a liquid binder between the first and second substrates so that the plurality of microcapsules face the first and second electrodes via the binder; applying pressure to the first or second substrate to flatten the microcapsules between the substrates; and causing the binder near the microcapsules flattened by the pressure to cure so as to fix the flattened microcapsules to at least the first substrate.

In the method of production of an electrophoretic display according to the present invention, the binder is a photocuring or heat curing binder and the method further comprises applying light or heat corresponding to the binder near the microcapsules flattened by the pressure to cause the binder to cure.

In the electrophoretic display according to the present invention, by flattening the display surface side of the plurality of microcapsules, it is possible to reduce the portion between microcapsules and possible to reduce the distance between substrates compared with when the microcapsules between the substrates are spherical.

In the method of production of an electrophoretic display according to the present invention, by applying pressure to the first or second substrate to flatten the microcapsules and causing the binder near the flattened microcapsules to cure, it is possible to hold the flat shape of the microcapsules and possible to reduce the distance between substrates compared with when the microcapsules between the substrates are spherical.

BEST MODE FOR CARRYING OUT THE INVENTION

Below, embodiments of the present invention will be explained referring to the appended drawings.

First Embodiment

Figure 1:
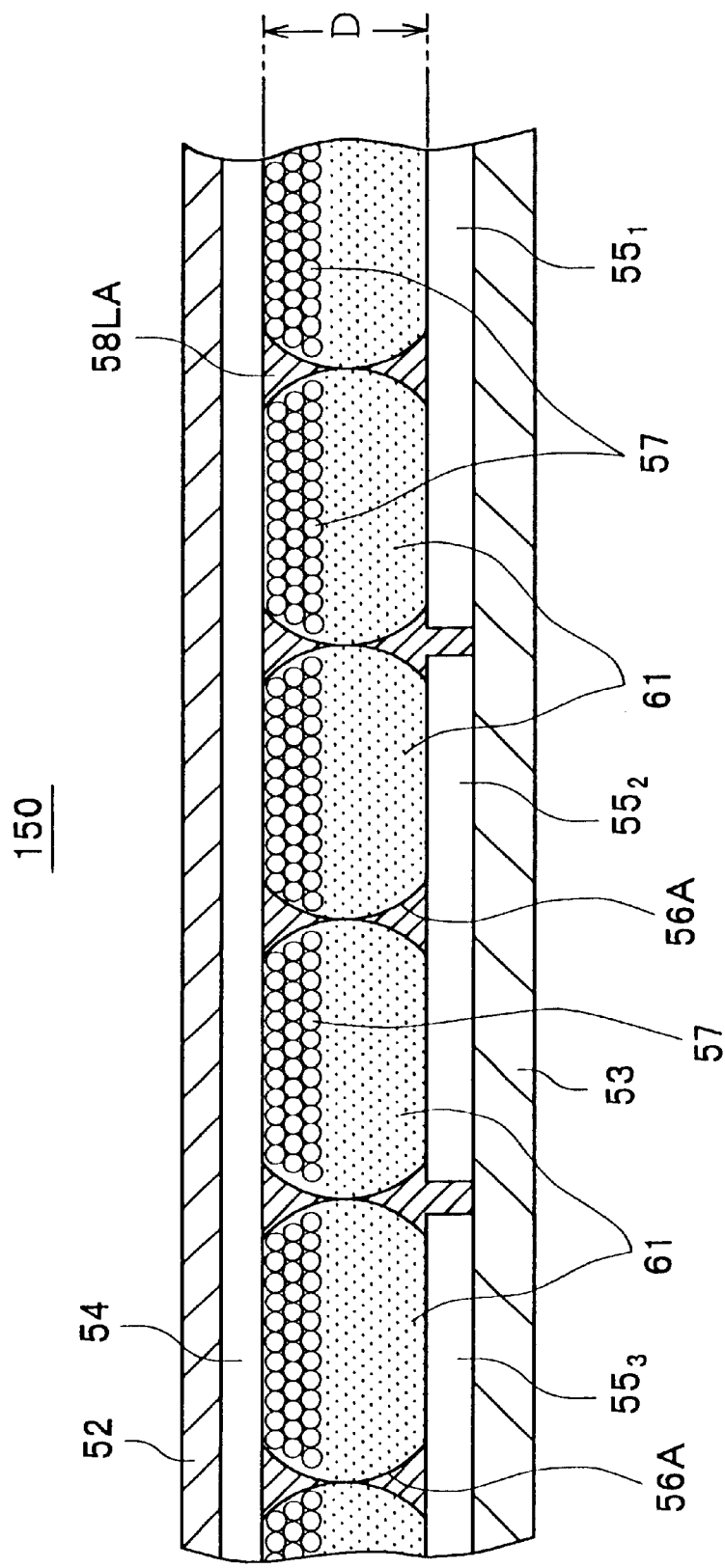
FIG. 1 is a principal sectional view for explaining a first embodiment of an electrophoretic display according to the present invention.

FIG. 1 is a principal sectional view for explaining a first embodiment of an electrophoretic display according to the present invention.

This electrophoretic display 150 is comprised of a back substrate 52 provided with a transparent electrode 54 and a transparent substrate 53 provided with a plurality of transparent electrodes $55_1$ to $55_n$ arranged at a predetermined distance D so that the transparent electrode 54 and the transparent electrodes $55_1$ to $55_n$ face each other.

Note that, in FIG. 1, only the three transparent electrodes $55_1$ to $55_3$ among the plurality of transparent electrodes $55_1$ to $55_n$ are illustrated.

The back substrate 52 is formed using an insulating synthetic resin.

The transparent substrate 53 is formed using an insulating synthetic resin such as PET.

The transparent electrode 54 and the transparent electrodes $55_1$ to $55_n$ are formed by ITO films or other transparent electrode films.

Between the transparent substrate 53 and the back substrate 52 are provided the large number of microcapsules 56A. The microcapsules 56A are flat in shape. The display surface side comprised of the transparent substrate 53 side and the back side comprised of the back substrate 52 side thereof are parallel.

The microcapsules 56A are individually sealed with (comprise) a dispersion comprised of electrophoretic particles 57 dispersed in a dispersion medium 61 (dispersion system) in advance by the microcapsulation technique. Pressure is applied to the spherical microcapsules to flatten them.

The electrophoretic particles 57 are comprised of for example white pigment or other charged particles.

The dispersion medium 61 is comprised of a colored dispersion medium colored for example black.

Hereinafter, the liquid mixture of the electrophoretic particles 57 and the dispersion medium 61 sealed in the microcapsules 56A is referred to as an electrophoretic display dispersion.

Between the transparent substrate 53 and the back substrate 52 are filled the large number of microcapsules 56A and a solid binder 58LA for fixing the large number of microcapsules 56A.

As the binder 58LA, a photocuring resin or other photocuring binder is used.

The microcapsules 56A preferably have flexibility.

Materials having flexibility as microcapsules 56A include arabic.rubber-gelatin based compounds or urethane-based compounds.

The urethane-based compounds have basic compositions of the following chemical formula. By selecting the substituent R1 or R2 in the formula, any flexibility may be obtained.

In the following chemical formula, a urethane-based compound is produced from isocyanate and alcohol:

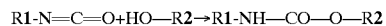

$$R1\text{-}N\text{=}C\text{=}O + HO\text{---}R2 \rightarrow R1\text{-}NH\text{---}CO\text{---}O\text{---}R2$$

Also, the microcapsules 56A preferably have a size which is uniform or substantially uniform.

For the microcapsules with substantially equal size, for example, it is possible to use filtration or classification by specific gravity to obtain microcapsules of a diameter of about 40 to 60 µm.

In such a configuration, for example, if the transparent electrode 54 is made the ground potential and a negative voltage is applied to the transparent electrodes $55_1$ to $55_3$, the charged particles, that is, electrophoretic particles 57, inside the microcapsules 6 between the transparent electrode 54 and transparent electrodes $55_1$ to $55_3$ move toward the transparent electrode 54. As a result, the microcapsules 6 exhibit a black color toward the direction of the transparent substrate 53.

Next, the method of production of the electrophoretic display according to the first embodiment will be explained.

Figure 2:
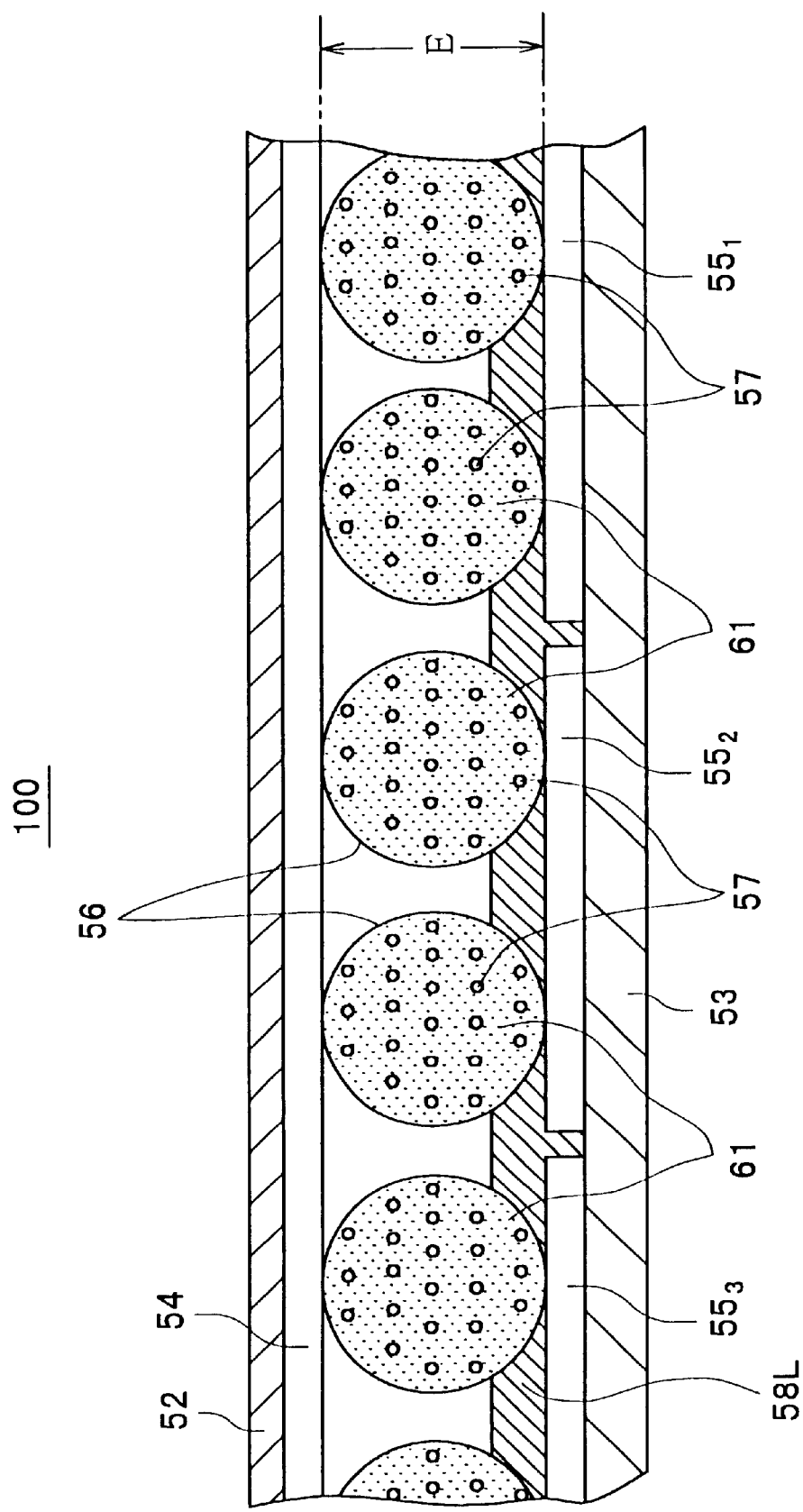
FIG. 2 is an explanatory view of a method of production of the electrophoretic display in FIG. 1.
Figure 3:
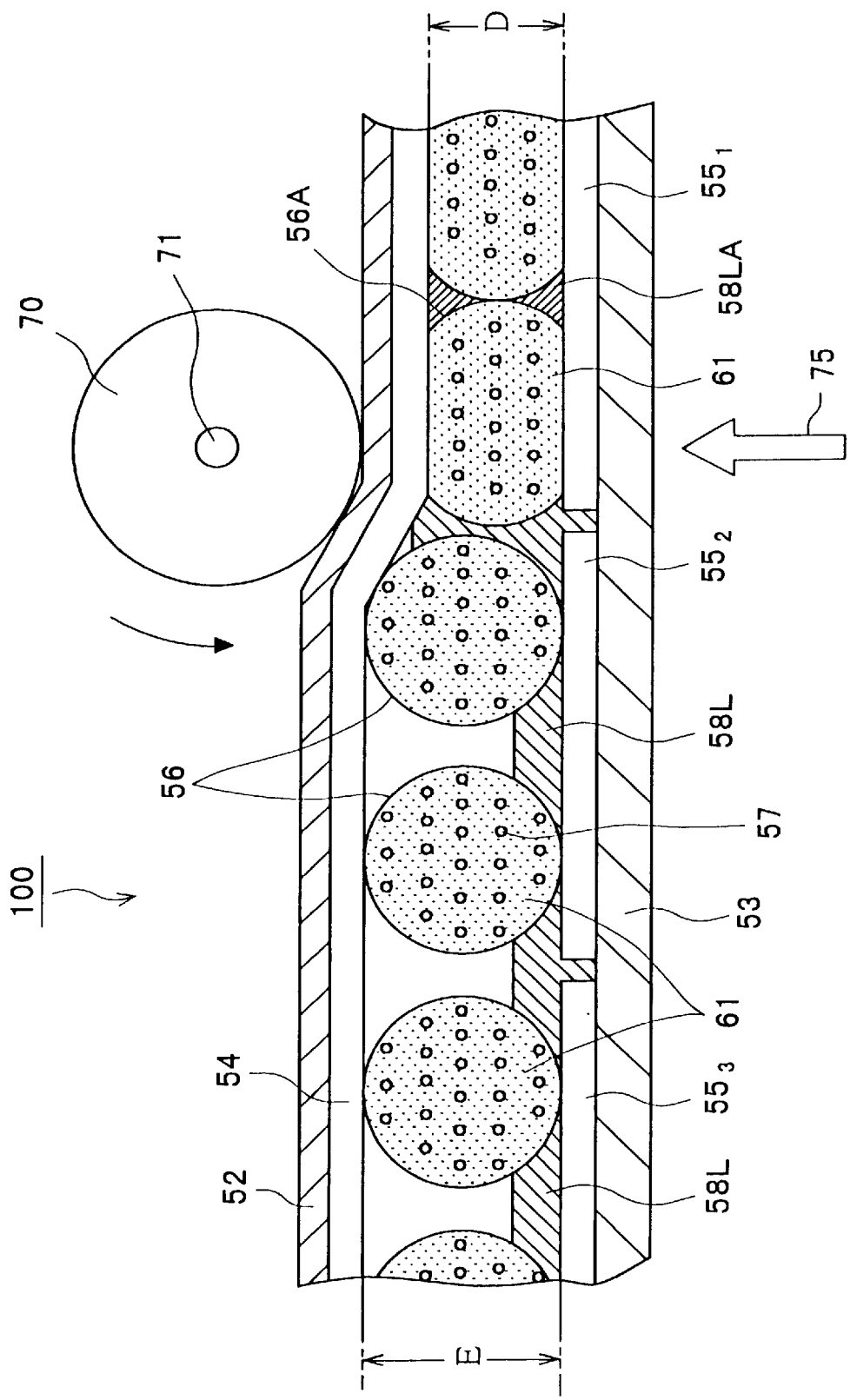
FIG. 3 is an explanatory diagram of the method of production of the electrophoretic display of FIG. 1 following FIG. 2.

FIG. 2 and FIG. 3 are views for explaining the method of production of the electrophoretic display according to the first embodiment and show a principal sectional view of the electrophoretic display.

The electrophoretic display 100 is produced through the following steps 1 to 5.

Step 1: The transparent electrode 54 is formed on a flexible back substrate 52. Also, transparent electrodes $55_1$ to $55_n$ are formed on the transparent substrate 53. Separately, the large number of microcapsules sealed with (comprise) a liquid mixture of electrophoretic particles 57 and the dispersion medium 61 are formed.

Step 2: The liquid binder 58L is coated on the transparent substrate 53 formed with the transparent electrodes $55_1$ to $55_n$.

Step 3: Spherical microcapsules 56 with substantially equal sizes are arranged on the transparent substrate 53 coated with the liquid binder 58L.

Step 4: The back substrate 52 and the transparent substrate 53 are arranged at a predetermined distance E so that the transparent electrode 54 and the transparent electrodes $55_1$ to $55_n$ face each other. The microcapsules 56 and liquid binder 58L are housed between the back substrate 52 and the transparent substrate 53.

An amount of the binder 58L required for filling the gaps between the microcapsules at the time of the final shaping of the electrophoretic display is coated on the surface of the transparent substrate 53.

Step 5: As shown in FIG. 3, a pressure roller 70 is brought into contact with an outer surface of the back substrate 52 of the electrophoretic display 100, pressure is applied, and the pressure roller 70 is made to relatively move, whereby the spherical microcapsules 56 are successively made to deform to flat-shaped microcapsules 56A.

At this time, the liquid binder 58L moves so as to fill the gaps between the microcapsules.

The liquid binder 58L near the microcapsules flattened by the pressure from the pressure roller 70 is irradiated with slit light 75 via the transparent substrate 53 so as to cause the liquid binder 58L to cure by the slit light 75 and form a solid.

By curing the liquid binder 58L to make the solid binder 58LA, the microcapsules 56A are fixed to the transparent substrate 53 and the back substrate 52 and held in the flat shape and the transparent substrate 53 and the back substrate 52 are bonded to each other by the binder 58LA to hold a predetermined distance D (<E).

In this way, the liquid binder 58L is lightly coated first and then the liquid binder 58L is made to cure while using pressure to flatten the microcapsules.

The relative movement between the pressure roller 70 and slit light 75 and the electrophoretic display 100 may be one making the direction of irradiation of the slit light 75 the direction of a roller shaft 71, fixing the electrophoretic display 100 in place, and making the pressure roller 70 and output device of the slit light 75 (not shown) move or may be one making the pressure roller 70 rotate at a constant position and making the electrophoretic display 100 move.

It is also possible to use two pressure rollers to grip the electrophoretic display 100 and press the electrophoretic display 100 from the display surface side and the back side.

As described above, it is also possible to use the pressure roller 70, slit light 75, and photocuring binder 58L to obtain the electrophoretic display 150 according to the first embodiment.

Note that in the electrophoretic display 100 shown in FIG. 2, the binder 58L is coated on the transparent substrate 53, but when producing the electrophoretic display 150, it is also possible to make the back substrate 52 a transparent material and coat the liquid binder 58L on the back substrate 52 and to irradiate slit light 75 from the back substrate 52 side or from the back substrate 52 side and transparent substrate 53 side.

Further, in the electrophoretic display 100 of FIG. 2, it is also possible to provide holes in the transparent substrate 53 or the back substrate 52 in advance so that excess materials other than the microcapsules 56 and binder 58L in the materials positioned between the transparent substrate 53 and the back substrate 52 are ejected at the time of pressure and to close the holes after curing of the liquid binder 58L.

Further, the excess materials may be made to be ejected at the time of pressure from the edges of the transparent substrate 53 or the back substrate 52 and the microcapsules 56A and binder 58LA sealed between the substrates 52 and 53 after the curing of the liquid binder 58L.

Second Embodiment

Figure 4:
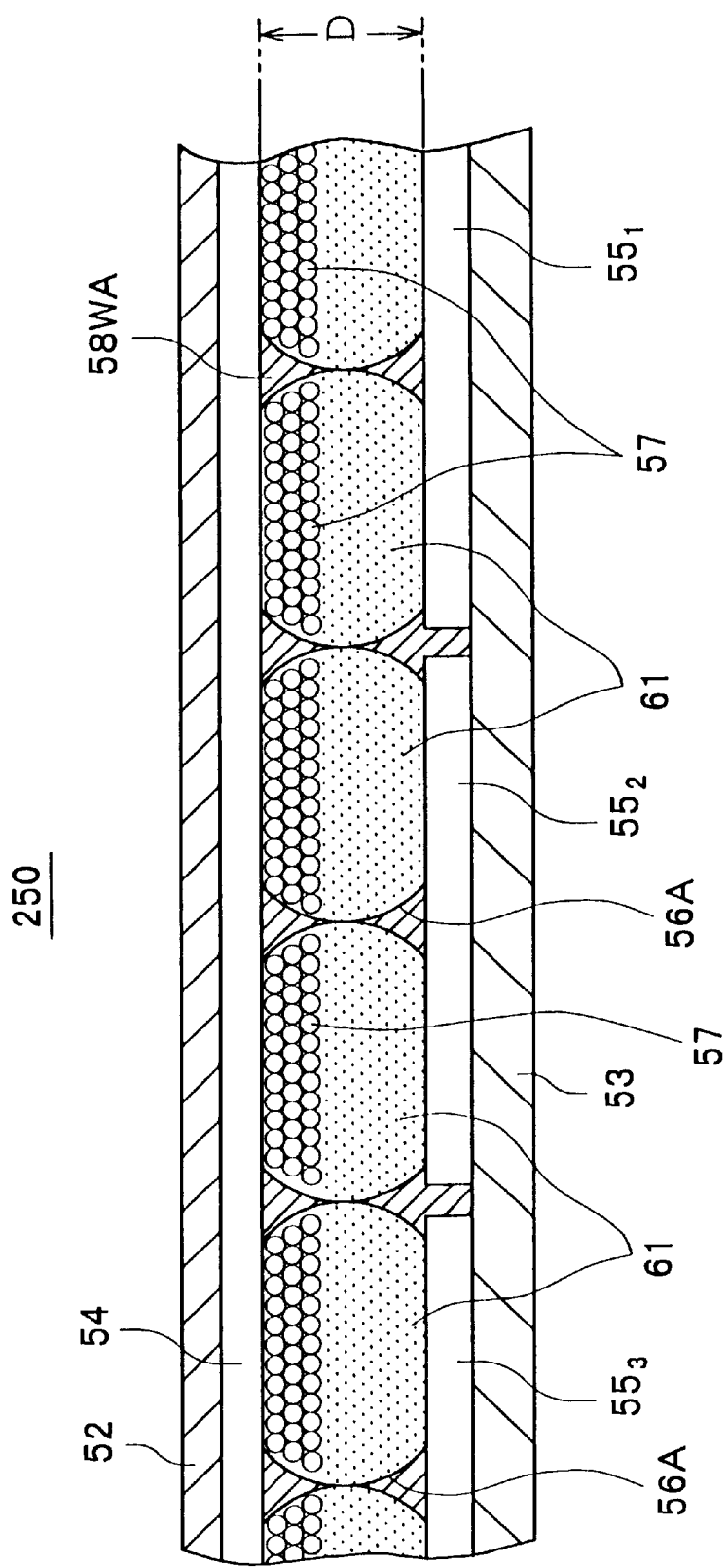
FIG. 4 is a principal sectional view for explaining a second embodiment of an electrophoretic display according to the present invention.

FIG. 4 is a principal sectional view for explaining a second embodiment of an electrophoretic display according to the present invention.

The electrophoretic display 250 is configured substantially the same as the electrophoretic display 150 according to the first embodiment, but the binder and the method of production differ.

In the electrophoretic display 250, parts the same as those of the electrophoretic display 150 shown in FIG. 1 are assigned the same reference numerals. Explanations of the same portions are omitted.

The transparent substrate 53 and the back substrate 52 are filled with the large number of flat-shaped microcapsules 56A and the solid binder 58WA for fixing the large number of microcapsules 56A.

As the binder 58WA, a water-soluble silicone resin or other photocuring material or heat curing urethane-based compound may be used.

Next, a method of production of the electrophoretic display according to the second embodiment will be explained.

Figure 5:
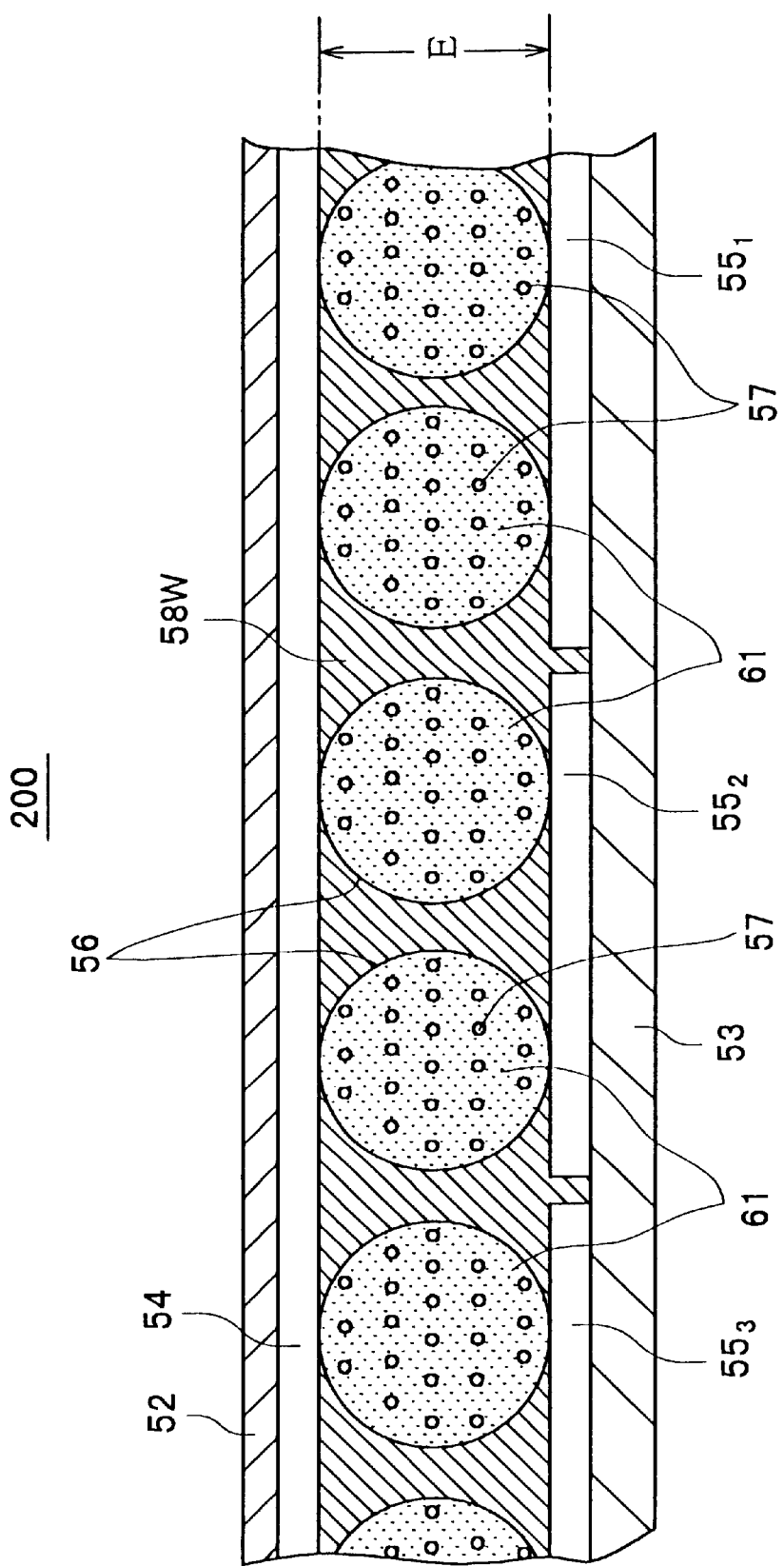
FIG. 5 is an explanatory view of the method of production of the electrophoretic display of FIG. 4.
Figure 6:
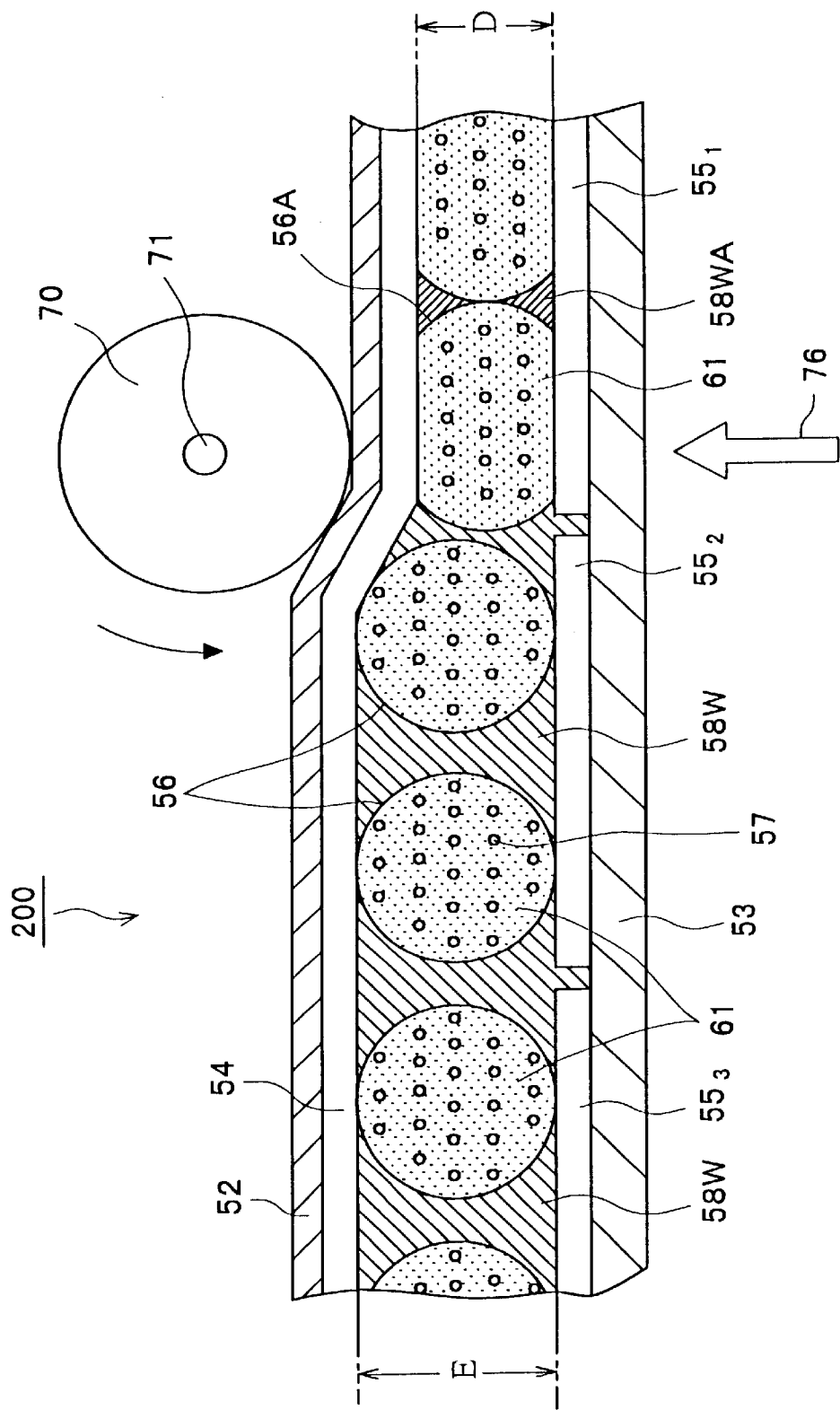
FIG. 6 is an explanatory diagram of the method of production of the electrophoretic display of FIG. 4 following FIG. 5.
Figure 7:
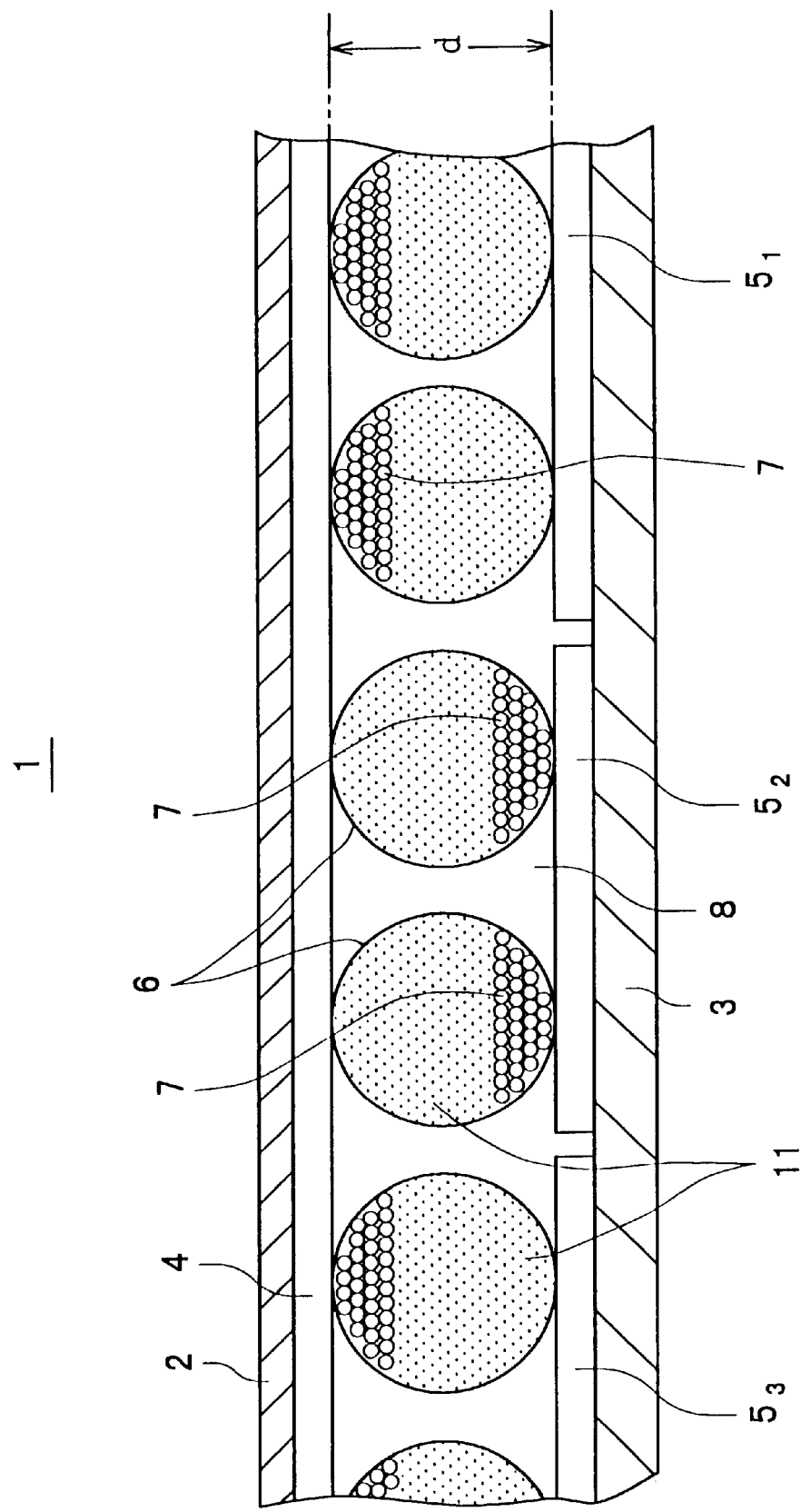
FIG. 7 is a principal sectional view for explaining an example of a conventional electrophoretic display.

FIG. 5 and FIG. 6 are explanatory views of the method of production of the electrophoretic display according to the second embodiment and show a principal sectional view of the electrophoretic display.

In the electrophoretic display 200 of FIG. 5, the binder 58W is liquid and is present in the state of an aqueous solution between the transparent substrate 53 and the back substrate 52.

The silicone resin and water in the liquid binder 58W are mixed in consideration of the desired flatness of the microcapsules, that is, the volume of the gaps between the microcapsules, so that the silicone resin will fill the gaps between the flattened microcapsules 56A.

In FIG. 6, the pressure roller 70 is brought into contact with the outer surface of the back substrate 52 of the electrophoretic display 200 and pressure is applied. The spherical microcapsules 56 are successively deformed to flat type microcapsules 56A by the pressure roller 70.

The liquid binder 58W near the microcapsules 56A flattened by this pressure is stripped of the moisture in the liquid binder 58W by heat rays 76 irradiated via the transparent substrate 53 and thereby shrunken and cured.

By curing the liquid binder 58W to make the solid binder 58WA, the microcapsules 56A are fixed to the transparent substrate 53 and the back substrate 52 and held in flat shape and the transparent substrate 53 and the back substrate 52 are bonded together by the binder 58WA and hold the predetermined distance D (<E).

In this way, the liquid binder 58W is used and heated to cause the moisture to evaporate off and thereby cause the heat curing binder 58W to shrink and cure while using pressure to make the microcapsules flat.

The relative movement of the pressure roller 70 and heat rays 76 with the electrophoretic display 200 may be one making the direction of irradiation of the heat rays 76 the direction of the roller shaft 71, fixing the electrophoretic display 200, and making the pressure roller 70 and the output device of the heat rays 76 (not shown) move or one making the pressure roller 70 rotate at a constant position and making the electrophoretic display 200 move.

It is also possible to use two pressure rollers to grip the electrophoretic display 200 and press the electrophoretic display 200 from the display surface side and the back side.

As described above, it is also possible to use the pressure roller 70, heat rays 76, and heat curing binder 58L to obtain the electrophoretic display 250 according to the second embodiment.

Note that in the electrophoretic display 200 shown in FIG. 5, it is also possible to provide holes in the transparent substrate 53 or the back substrate 52 in advance so that the moisture in the liquid binder 58W are ejected at the time of pressure or heating and to close the holes after curing of the liquid binder 58W.

Further, the moisture may be made to be ejected at the time of pressure or heating from the edges of the transparent substrate 53 or the back substrate 52 and the microcapsules 56A and binder 58WA sealed between the substrates 52 and 53 after the curing of the liquid binder 58W.

Further, it is possible to use a heat shrinking material as the binder 58W and making the liquid binder 58W shrink and cure by heating while using the pressure roller 70 to flatten the microcapsules 56.

In the embodiments, the transparent electrode of the transparent substrate 53 may be made an ITO film by sputtering. Also, it is possible to make the back electrode of the back substrate 52 a copper foil and irradiate slit light or heat rays from the transparent substrate 53 side.

It is also possible to interpose spacers between the substrates so as to maintain the distance between the substrates at a constant distance at the time of the final shaping of the electrophoretic display. The spacers may be made of a photocuring or heat curing material.

In the electrophoretic display according to the above embodiment, since at least the display surface side of the microcapsules is flattened, it is possible to reduce the gaps between the microcapsules where the binder is present at the display surface side compared with when the microcapsules between the substrates are spherical and therefore possible to increase the change of contrast.

Also, since at least the display surface side of the microcapsules is flattened, it is possible to reduce the distance between substrates compared with when the microcapsules between the substrates are spherical and therefore possible to reduce the difference of application voltage between electrodes and possible to make the electrophoretic display 150, 250 thinner.

Further, since the microcapsules are sandwiched between the transparent substrate 53 and the back substrate 52 and the display surface side and the back side are flattened, the electric field intensity acting on the electrophoretic display dispersion can be made substantially uniform and localization of electrophoretic particles can be suppressed.

Further, by making the display surface side and the back side of the microcapsules flat, it is possible to further reduce the gaps between microcapsules where the binder is present and bring the structure of the electrophoretic display close to that of a cell type structure and possible to improve the contrast.

Further, by reducing the distance between substrates, it is possible to improve the response compared with before reducing the distance between substrates.

For example, the movement speed v of the electrophoretic particles is believed to be substantially proportional to the electric field intensity Ein. This is expressed as following using the proportional constant k.

$$v = k \cdot Ein \quad (1)$$

Further, the time T required for electrophoretic particles to move from one electrode to another electrode (response time) is expressed as following using the distance between electrodes (distance between substrates) A.

$$T = A/v \quad (2)$$

The electric field intensity Ein can be found by dividing the application voltage (potential difference between electrodes) Vin by the distance between electrodes A and is expressed by the following.

$$Ein = Vin/A \quad (3)$$

By deleting the movement speed v and electric field intensity Ein from the above (1) to (3), the response time T is expressed as the following.

$$T = A^2/(k \cdot Vin) \quad (4)$$

According to the above equation (4), the response time T is proportional to the square of the distance between electrodes A and is inversely proportional to the application voltage Vin.

According to the above equation (4), when, as one example, microcapsules with a diameter of 50 μm arranged at the maximum density form regular hexagonal columnar flat shapes with unchanged volumes, the height of the regular hexagonal columns becomes about 30 μm. In this case, the distance between electrodes A becomes about 60%, the response time T becomes about 36%, and the display can be switched in about ⅓ of the time.

Also, when it is not necessary to reduce the response time T, it is possible to reduce the application voltage to about ⅓ and thereby possible to obtain the effects of simplification of the display drive circuit, reduction of cost, and prevention of heat buildup.

INDUSTRIAL APPLICABILITY

In the electrophoretic display according to the present invention, by flattening the display surface side of the plurality of microcapsules, it is possible to reduce the gaps between microcapsules and improve the contrast and possible to improve the quality.

Further, it is possible to make the electrophoretic display thinner.

Further, with in electrophoretic display according to the present invention, since the display surface side and the back side of the plurality of microcapsules are flattened, the electric field intensity acting on the electrophoretic display dispersion can be made uniform, localization of the electrophoretic particles can be suppressed, and the quality can be further improved.

According to the method of production of an electrophoretic display according to the present invention, it is possible to produce an electrophoretic display where at least the display surface side of the plurality of microcapsules is flattened and possible to obtain a thin electrophoretic display with improved contrast.

What is claimed is:

1. An electrophoretic display, comprising:
   a first substrate comprising a transparent substrate, on one surface of which a transparent electrode comprising a first electrode is formed and the other surface of which forms a display surface;
   a second substrate on one surface of which a second electrode is formed and arranged in parallel with said first substrate so that said second electrode faces said first electrode; and
   a plurality of microcapsules containing a dispersion comprising a liquid phase dispersion medium and electrophoretic particles, arranged between said first and second electrodes so as to contact each electrode, and each microcapsule having a flat shape in a sectional plane along a first direction perpendicular to parallel planes of said first and second electrodes by deformed (squeezed) between said first and second electrodes, a first length of each microcapsule in a second direction parallel to said first and second electrodes and perpendicular to the first direction being longer than a second length of each microcapsules in the first direction.

2. A method of producing an electrophoretic display having a plurality of microcapsules containing a dispersion comprising a liquid phase dispersion medium and electrophoretic particles, a first substrate comprised of a transparent substrate provided with a first electrode comprised of a transparent electrode, and a second substrate provided with a second electrode, including the steps of;

housing said plurality of microcapsules and a liquid binder between said first and second substrates so that said plurality of microcapsules face said first and second electrodes via said binder;

applying pressure between said first and second substrates to deform (squeeze) said microcapsules between said first and second substrates so that each microcapsule has a flat shape in a sectional plane along a first direction perpendicular to parallel planes of said first and second electrodes by the deformation, a first length of each microcapsule in a second direction parallel to said first and second electrodes and perpendicular to the first direction being longer than a second length of each microcapsule in the first direction; and causing said binder near said microcapsules flattened by said pressure to cure so as to fix said flattened microcapsules to at least said first substrate.

3. A method of producing an electrophoretic display as set forth in claim 2, wherein:

said binder comprises a photocuring or heat curing binder and further including a step of giving light or heat corresponding to said binder near the microcapsules flattened by said pressure to cause said binder to cure.

4. A method of producing an electrophoretic display as set forth in claim 3, further including a step of bringing a pressure roller into contact with an outer surface of said first or second substrates and making said pressure roller rotate so as to successively flatten said plurality of microcapsules.

5. A method of producing an electrophoretic display as set forth in claim 2, further including a step of bringing a pressure roller into contact with an outer surface of said first or second substrates and making said pressure roller rotate so as to successively flatten said plurality of microcapsules.

\* \* \* \* \*

UNITED STATES PATENT AND TRADEMARK OFFICE
CERTIFICATE OF CORRECTION

PATENT NO. : 6,597,340 B1
APPLICATION NO. : 09/674679
DATED : July 22, 2003
INVENTOR(S) : Hideyuki Kawai Page 1 of 1

It is certified that error appears in the above-identified patent and that said Letters Patent is hereby corrected as shown below:

In claim 1:
    Col. 8, line 67, after "by" insert --being--,
    Col. 9, line 5, change "microcapsules" to --microcapsule--.

Signed and Sealed this

Thirty-first Day of March, 2009

JOHN DOLL
*Acting Director of the United States Patent and Trademark Office*